July 10, 1956  I. JEPSON  2,753,583
GROOMING DEVICE
Filed Feb. 15, 1951  2 Sheets-Sheet 1

Inventor
Ivar Jepson
by McCanna & Morsbach
Atty's.

July 10, 1956  I. JEPSON  2,753,583
GROOMING DEVICE

Filed Feb. 15, 1951 2 Sheets-Sheet 2

Inventor
Ivar Jepson
by
McCanna & Morsbach
Attys.

United States Patent Office 2,753,583
Patented July 10, 1956

2,753,583

GROOMING DEVICE

Ivar Jepson, Oak Park, Ill., assignor to Sunbeam Corporation, Chicago, Ill., a corporation of Illinois Application February 15, 1951, Serial No. 211,060

3 Claims. (Cl. 15—246)

The present invention relates to a grooming device or mechanism and is particularly concerned with a grooming attachment for a motor unit which may be used to drive numerous other devices such as clippers, shears, drills and the like.

For many years there has been a need for an all purpose power brush or grooming device for farm animals, particularly horses and cows. The customary way of grooming cattle has comprised using a hand brush and hand curry comb, which was a time consuming process and as a result, cattle and particularly dairy cattle, did not get the grooming which has been found to be desirable for promoting good health of the animals as well as an improved appearance. It would be desirable to provide a grooming device which is capable in a simple manner without much work on the part of the operator to produce a desirable bloom to animal's coats by bringing out the natural oils of their skin. Such a device should, moreover, efficiently clean the animal's coats by removing loose hair as well as imbedded dust and dirt. With such a device, therefore, it would be possible to not only impart a lustre to the hair, but in addition the animal's skin is massaged to maintain it soft and pliable, all of which tends, in addition to producing a much more desirable appearance, to promote general all around health. There have been available on the market clipping and shearing devices which have been extensively used and which employ a suitable electric motor for driving the same. Such an arrangement is disclosed in U. S. Letters Patent No. 2,268,035, Jepson, granted December 30, 1941, and assigned to the same assignee as the present application. In that Jepson patent the motor unit is built within a casing which serves as the handle which is attached to one end to a suitable clipping and shearing device. It would be desirable if such a device were provided in which the clipping and shearing head could be removed in a simple manner and replaced with the grooming device of the present invention whereby the function of both devices could be retained without the expense of two completely separate motor units.

It will be appreciated that a power grooming device will of necessity comprise a power driven brush of some sort which will raise dust and hairs imbedded in the animal's coat. It is desirable to provide an arrangement in which such dust and hairs are shielded from the operator as well as from the animal being groomed so that the material removed from the animal's coat is not permitted to drop back onto the coat. Consequently, not only a shielding device is desirable, but a device for catching and retaining the removed particles from which they can be periodically removed in simple manner.

With any power driven grooming brush the problem of removing foreign material firmly imbedded within the animal's coat or hair sometimes presents a difficult problem and it would be desirable to provide in the grooming device a portion thereof which will permit more ready removal of such material thereby to permit the power driven brush mechanism to function efficiently.

Accordingly, it is an object of the present invention to provide a grooming device especially adapted for grooming animals such as cattle, horses and the like.

It is another object of the present invention to provide a grooming device which is adapted to be attached to a motor which may also drive other appliances such as clippers, sheep shears, power drills and the like.

Still another object of the present invention resides in the provision of an improved shielding mechanism for a power driven grooming device whereby not only is the operator shielded from dust and foreign material removed from the coat of the animal being groomed, but in addition this material is caught and retained so as to prevent it from falling back on the coat being groomed.

A further object of the present invention resides in the provision of a power driven grooming device including rotatable brush elements which may readily be replaced when such replacement is necessary and which are designed to give the maximum grooming action.

It is another object of the present invention to provide a combined shield and curry comb for a power driven grooming device.

Another object of the present invention resides in the provision of a power driven grooming device including a reduction gear mechanism between the prime mover and the rotating grooming mechanism having a dimension such as not to interfere in any substantial way with the grooming action of the power driven grooming mechanism whereby a maximum continuous area may be covered by the device.

Further objects and advantages of the present invention will become apparent as the following description proceeds and the features of novelty which characterize the invention will be pointed out with particularly in the claims annexed to and forming a part of this specification.

For a better understanding of the present invention reference may be had to the accompanying drawings in which.

Briefly, the present invention is concerned with a power driven grooming device comprising a pair of rotating brushes between the adjacent ends of which the reduction gear mechanism for driving the brushes is disposed, said reduction gear mechanism taking up a very small space so that by displacing the end bristles of the brushes, sufficient overlap of the gear housing is obtained to give substantially complete coverage as far as the brush is concerned. Attached to the mechanism for supporting and driving the grooming brushes is a shield device which completely shields the operator from particles removed by the grooming brushes and which additionally includes a dust catching device which tends to remove the dirt particles and the like from the brushes and catch and retain them until removed by the operator. Additionally, the shield mechanism includes as a portion thereof, a serrated edge serving as a curry comb so that by merely inverting the mechanism, the device serves as a handy curry comb.

Figure 1:
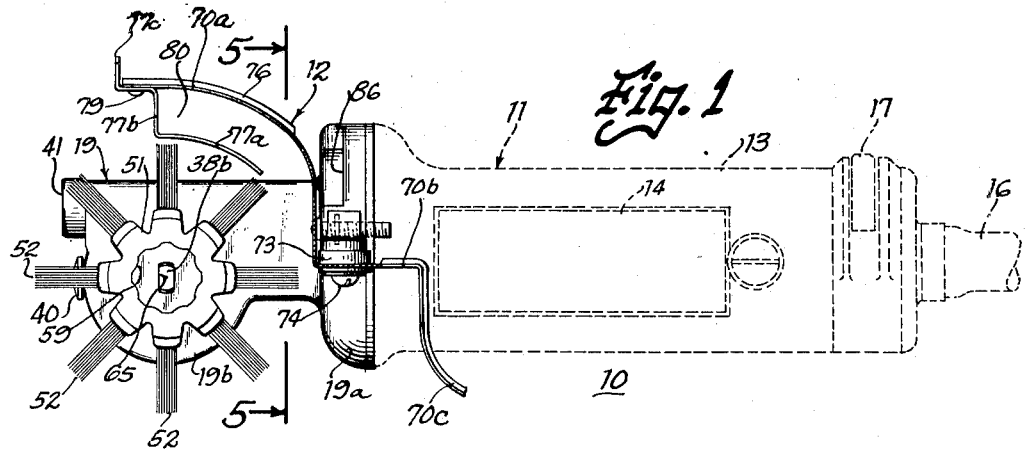
Fig. 1 is a side elevational view of the grooming device of the present invention with the prime mover for driving the same shown in dotted lines to illustrate the fact that the grooming device may comprise one of several attachments driven at different times by the same prime mover such as an electric motor.
Figure 4:
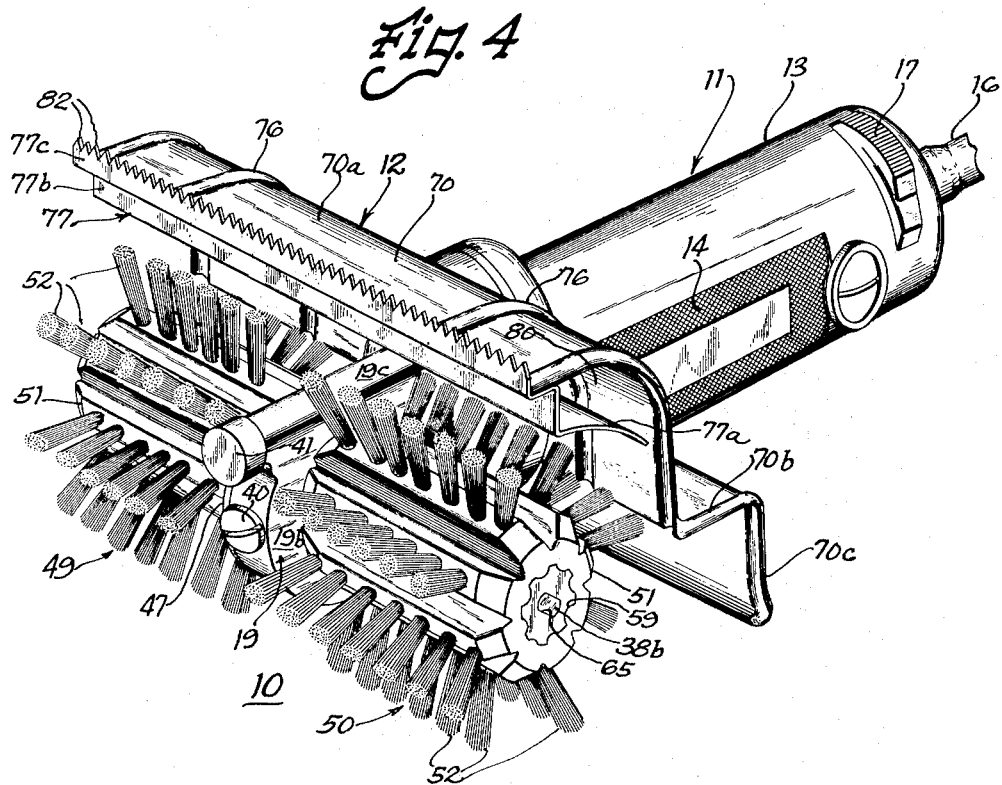
Fig. 4 is an enlarged perspective view of the complete grooming unit including the prime mover for driving the same.

Referring now to the drawings, there is illustrated as best shown in Fig. 4 of the drawings, the power driven grooming device of the present invention specifically designated by the reference numeral 10. This power driven grooming device comprises the prime mover, preferably an electric motor unit, generally designated at 11 and the grooming attachment generally designated at 12. The prime mover 11 is shown in dotted lines in Fig. 1 in order to illustrate the fact that the grooming device may comprise an attachment for a prime mover such as 11 which at other times may be used to drive various devices particularly useful on farms such as a clipping head, a shearing head, a drilling head or the like.

The particular construction of the motor unit 11 forms no part of the present invention and preferably it is of a very similar construction to that disclosed in the above mentioned Jepson Patent 2,268,035, and also in many respects similar to the motor of the device described in copending Jepson application Serial No. 8579, filed February 16, 1948, now Patent No. 2,664,626, January 5, 1954, and also assigned to the same assignee as the present application. This copending application shows a motor unit similar to that disclosed in the present application employed to drive a hedge trimmer inidcating a still further appliance or device which might comprise an attachment for the motor 11.

As illustrated in the drawings, the motor unit 11 comprises a housing 13 preferably formed of a molded plastic or the like which is provided on its sides with a knurled surface such as 14 to provide a ready hand grasp for the operator in manipulating the particular attachment associated with and driven by the motor unit 11. The casing 13 is preferably a cylindrical elongated casing readily graspable by the operator so as effectively to define a handle for the appliance driven by the motor, which appliance is attached to one end of the motor housing as described in greater detail hereinafter. To the end opposite that to which the appliance being driven by the motor unit 11 is associated, there is preferably attached a power driven cord 16 electrically connected to the motor of the motor unit 11 and adapted to be connected in the conventional manner to any suitable electrical outlet. The motor unit 11 is preferably a universal motor so that it may be driven by a source of direct current as well as a source of alternating current energy. The exterior of the housing 13 preferably has applied thereto a suitable on-off switch actuator 17 whereby a suitable switch controlling the supply of electrical energy to the motor within the housing 13 may be controlled.

Figure 5:
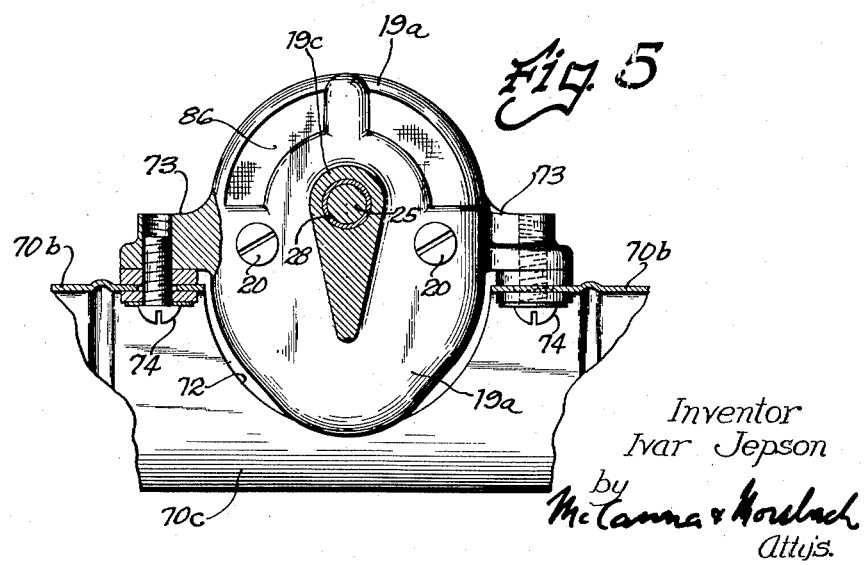
Fig. 5 is a sectional view taken on line 5—5 of Fig. 1 with certain portions cut away to illustrate the simple means by which the comb and shield of the present invention is attached to the grooming device and also how the grooming device is attached to the prime mover.

The grooming attachment 12 of the present invention comprises a suitable housing 19 for housing the driving mechanism for transmitting the motion from the motor or prime mover 11 to the power driven grooming mechanism including rotatable brushes to be described hereinafter. As illustrated, the housing 19 comprises preferably a die cast unit of aluminum or other light metal having a portion 19a shaped to conform to the end of the motor unit 11 for ready attachment thereto by a pair of screws 20, best shown in Fig. 5 of the drawings. The motor unit 11, as is illustrated best in Fig. 3 of the drawings, comprises a motor shaft which extends slightly beyond the end of the housing 13 and includes a spiral gear 22 for driving any suitable attachment which may be applied to the end of the motor unit 11. The housing portion 19a described above is provided with a suitable recess 23 for receiving therein the spiral gear 22, which in turn drivingly engages a gear 24 mounted on the end of a worm shaft 25. The recess 23 already described at the end of the housing section 19 adjacent the motor unit 11 is sufficiently large to also receive the gear 24.

The housing section 19 includes a narrow forwardly extending portion 19b including an upper, somewhat tubular portion 19c for receiving therein the worm shaft 25. This tubular portion 19c is open at both ends to make it easier to die cast the housing 19 in view of the rather extensive length of this tubular portion 19c and, furthermore, to permit accurate reaming of the same to receive a plurality of bearing members 26, 27 and 28 clearly shown in Fig. 3 of the drawings.

Figure 3:
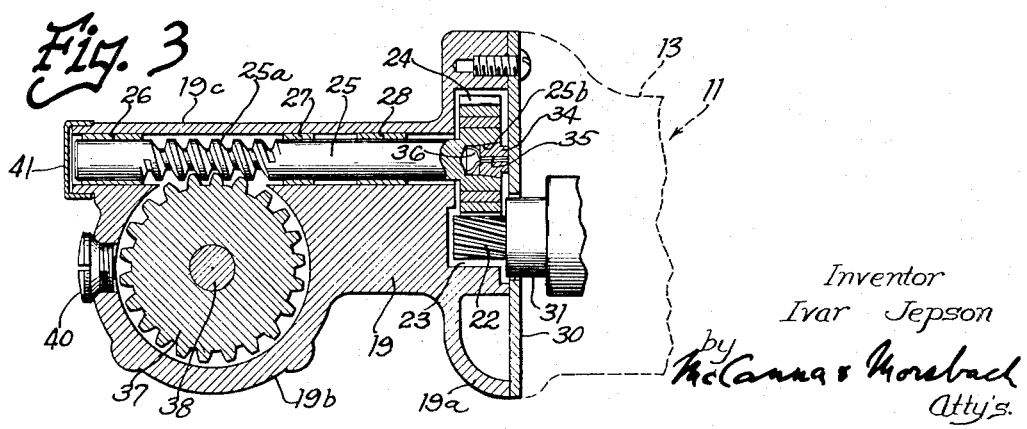
Fig. 3 is a sectional view taken along line 3—3 of Fig. 2, assuming that Fig. 2 shows the complete construction.

The worm shaft 25 with the gear 24 attached thereto may be inserted into the tubular portion 19c from the right hand end as viewed in Fig. 3 of the drawings, and the recess 23 closed by a suitable closure plate 30 which has an opening 31 therein to receive the end of the motor shaft and the spiral gear 22 drivingly connected thereto. The worm shaft 25 includes a worm gear section 25a which is disposed between the bearings 26 and 27 while the bearing 28 effectively acts as the bearing for the portion of worm shaft 25 adjacent gear 24.

The worm 25a is so designed to cause an end thrust toward the right, as viewed in Fig. 3 of the drawings. In order to provide a suitable thrust bearing for this end thrust, the end of the worm shaft 25 is provided with a conical recess 25b for receiving therein a suitable thrust bearing 34. The thrust bearing 34 is preferably pressed partially into the conical recess 25b. As illustrated, the recess 25b is filled with suitable lubricating material, and in order that this lubricating material may be transmitted to the thrust surface, the thrust bearing 34 is provided with a suitable longitudinal passageway 35 for receiving therein a wick 36 serving to transmit the lubricant through the thrust bearing and against the thrust surface. The thrust bearing 34, moreover, bears against the end plate 30 already described for closing the recess 23 adjacent the motor unit 11.

For the purpose of transmitting the torque from the worm 25a to a suitable rotating device for grooming cattle or the like, there is provided a gear 37 mounted on an elongated shaft 38 journaled in suitable bearings 39 and 40 supported within the housing section 19b of the die cast housing 19. It will be observed particularly from Figs. 2 and 4 of the drawings that the die cast housing portion 19b is relatively narrow in the direction of the longitudinal axis of the elongated shaft 38, the purpose of which will become apparent as the following description proceeds.

Figure 2:
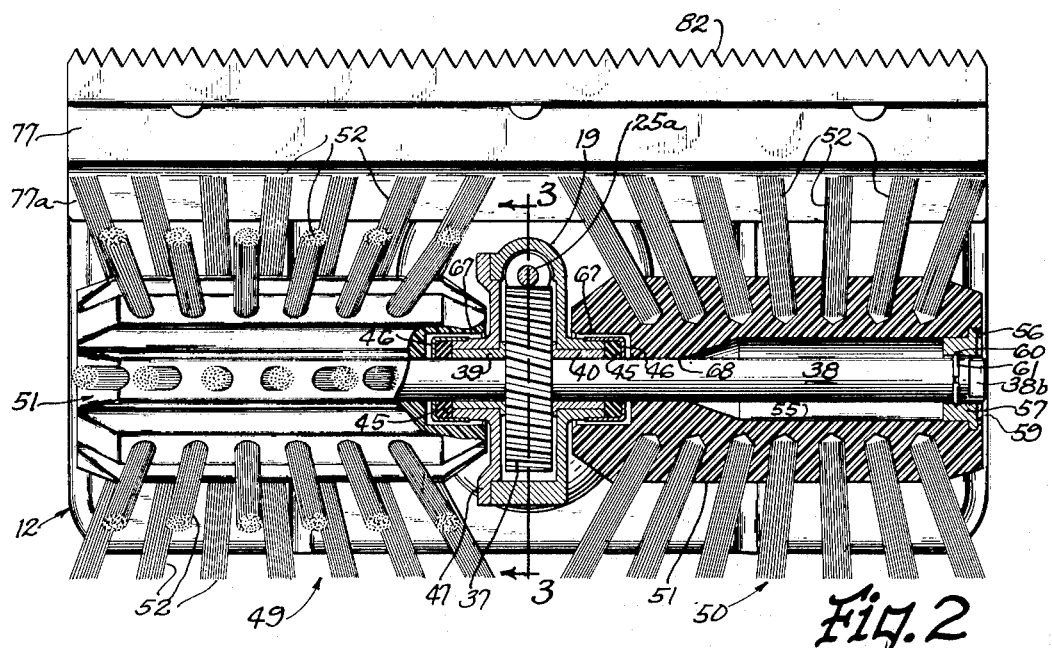
Fig. 2 is an enlarged front view, partly in section, of the grooming device shown in Fig. 1.

It will be obvious that the gears 23, 24, worm 25a and gear 27 should be well lubricated to insure long life of the mechanism and accordingly the housing 19 is adapted to be filled with lubricant through a suitable lubricant opening which is closed by a closure such as screw 40. To prevent lubricant from escaping through the open end of the tubular portion 19c of the housing 19, there is provided a suitable closure cap 41 which may be pressed into place if desired. Likewise, to prevent lubricant from escaping from the gear housing 19 where the shaft 38 protrudes from either side of the housing, there are provided suitable sealing washers 45 which are held in place by cover plates 46 pressed on to bosses integrally formed with the housing 19. It may be observed, as best shown in Fig. 2 of the drawings, that the housing 19 includes a cover portion 47 which is attached to the main housing portion 19 by suitable screws or fastening means not shown in the drawings. This cover portion provides the boss for receiving the bearing 39 and one of the end caps 46 which, moreover, affords access to the gear 37 and permits initial assembly of the gear shaft 38 and attached gear 37.

In accordance with the present invention, the ends of shaft 38 protruding from the housing 18 drivingly support a pair of grooming brushes 49 and 50. As illustrated in the drawings, each of these grooming brushes are identical and comprise a central hub portion 51 of a suitable molded plastic such as cellulose acetate or the like which have molded therein in spaced rows tufts of bristles 52. The center-most bristles tend to be disposed substantially perpendicularly with the longitudinal axis of the shaft 38, but the tufts of bristles adjacent the ends of the hubs 51 are disposed at a substantial angle in a direction to cause the ends of the bristles most remote from the hub 51 to extend in a direction toward the end of the hub. With this arrangement a greater coverage by the bristles is obtained than the width of the hub and, as is best shown in Fig. 2 of the drawings, the bristles at the adjacent ends of the hubs 51 of the brushes 49 and 50 tend to substantially overlap the narrow gear casing thereby affording a substantially continuous brush surface extending from the outer-most ends of the two brush sections 49 and 50. As illustrated, the hub portions 51 are ribbed with the bristles being disposed in rows along each rib. The bristles are preferably nylon to provide long life and satisfactory service although other types of bristles may be employed.

In order that the brushes 49 and 50 may be associated in driving relationship to the respective ends of the shaft 38 in a manner that permits ready replacement, the outer ends of the hubs 51 are provided with an enlarged opening 55 with an outside portion of larger diameter 56 to receive therein a sort of stepped bushing 57, which is preferably pressed into position. In order to prevent removal of the bushing 57, a suitable hot tool may be applied to the end of the hub to heat seal the bushing in place. When a plastic material such as cellulose acetate is employed merely a cold flow of the material or a staking operation can be employed to hold the bushing 57 in place. Such an arrangement has been illustrated in the drawings which staking operation causes the sort of scalloped appearance 59 of the ends of the hubs 51 adjacent the bushing 57. The bushing 57, moreover, is provided with a V-shaped groove 60 along the longitudinal length thereof to receive therein a spring washer 61 disposed within a similar groove adjacent the associated end of the shaft 38. Moreover, the ends of the shaft 38 are provided with opposed flat surfaces designated as 38b to be received within openings 65 of similar shape defined within the bushings 57 thereby to provide transfer of the driving torque from the shaft 38 to the brush hubs 51. With the above described arrangement it will be apparent that the brushes 49 and 50 may be pulled on and off the shaft 38 in a simple manner, and yet with the portions 38b inserted into the corresponding openings 65 of the bushing 57, the brushes are drivingly connected to the shaft 38. Moreover, the spring washer 61 and cooperating groove 60 tend to lock the brushes in place in a manner which still permits ready removal thereof with the application of a relatively slight force to the hubs 51 in a direction along the longitudinal axis of the shaft 38.

As best shown in Fig. 2 of the drawings, the hubs 51 are provided with a suitable recess 67 adjacent the end remote from the hub 57 in order to accommodate the closure caps 46 protruding from the gear housing 19 and cover 47. Also the hubs 51 of the brushes 49 and 50 are provided with a section remote from bushings 57 having a relatively small opening 68 only slightly larger than the diameter of the shaft 38 in order to serve as a sort of inner bearing for the hubs 51 on the shaft 38.

With the above described arrangement, the rotation of the motor disposed within the motor unit causes counter-clockwise rotation of the brushes 49 and 50 as viewed in Fig. 4 of the drawings and when applied to the coat of cattle or the like, it will be apparent that dirt and other material including loose hairs disposed on the animal's coat will be removed. However, in view of the rotating action of the brushes, this material will tend to be thrown toward the operator's hand grasping the housing 13 and some of the material will be carried over the dropped back on the animal's coat. To prevent this, there is provided in accordance with the present invention, a double shield comprising a sheet metal stamping 70 having an arcuate portion 70a overlying the brushes 49 and 50, a flat step portion 70b providing means for attaching the shield to the grooming device 12, and a trailing skirt portion 70c to catch particles tending to be thrown rearwardly by the brushes 49 and 50. This shield is provided with a suitable opening 72 to receive the end of the motor housing 13 and a portion of the gear housing 19. Preferably and for the purpose of supporting this shield, the gear housing 19 is provided with a pair of laterally extending ears 73, best shown in Fig. 5 of the drawings, which are provided with threaded openings to receive suitable fastening means 74 extending through the step portion 70b of the shield 70. This shield will prevent any particles tossed around by the brushes 49 and 50 being thrown at the operator or the operator's hand. In order to impart strength and rigidity to the stamping portion comprising the shield 70, the latter is provided with a plurality of ribs 76.

For the purpose of catching and retaining particles removed from the surface being groomed which are prevented from striking the operator by virtue of the shield 70, there is provided an additional shield portion designated at 77 including a rather arcuate portion 77a which is disposed in a somewhat parallel and spaced relationship with the portion 70a of the shield or guard 70. This arcuate portion 77a is connected by an L-shaped portion 77b which latter is riveted or otherwise secured by means indicated at 79 to the shield 70. Thus, there is defined a sort of pocket or recess 80 within which particles removed by the brushes are caught and retained thereby. At periodic intervals the operator may turn the grooming mechanism through an angle of 90 degrees to shake out the material caught in this pocket or recess 80 from either end thereof. This pocket is so arranged that a mere shake of the mechanism removes the particles caught therein and with experience this can be done in a motion comprising almost part of the grooming operation.

Often particles are so firmly imbedded within the animal's coat that the brushes 49 and 50 are not able to remove the same. Since it is not desirable for any great pressure to be applied to the animal's coat in the interest of comfort to the animal, another feature of the present invention comprises an extension 77c of the portion 77 which protrudes beyond the upper end of the shield, and is provided with serrations 82 defining a curry comb, whereby the operator may merely invert the device and use the curry comb or turn it around and use the brush portion. The members 70 and 77 effectively comprise a subassembly of a combined shield and comb unit.

It should be understood that the casing or housing 13 must be provided with suitable ventilating openings for air cooling the motor unit 11 and to this end the housing 19 is provided with somewhat semi-circular openings 86 through which air may enter the motor housing. These openings are disposed above the shield 70 whereupon particles of foreign material or dust or hair raised by the brushes 49 and 50 when operating are prevented from entering the motor housing.

In view of the detailed description included above, it will be apparent that there has been provided a new and improved grooming device which may be employed with great success in grooming cattle and the like. Moreover, by the mere removal of the screws 20, the grooming attachment may be removed from the motor unit 11 and any other suitable attachment applied thereto. By means of the curry comb comprising the serrations 82, the hard to remove foreign particles may be loosened up so that it is not necessary to apply too much pressure to the animal's coat. Actually, it has been found through extensive use that the brushes will clean faster and more thoroughly if applied lightly to the area to be brushed. If too much pressure is applied, the motor will stop, which is an important safety feature of the present invention, since if the animal, for example, should switch its tail and have it caught in the revolving brushes, the motor will stop without damage being done and without the requirement of the manipulation of the switch actuator 17. When the grooming device is used on animals shedding their long winter coats, or where there is much caked and dried extraneous matter associated therewith, the built-in curry comb is first used, whereupon the bristles can then penetrate to the animal's skin and will do a good job of cleaning. Should the bristles be worn down from extensive use, it will be apparent that new brushes can readily be applied.

While there has been illustrated and described a particular embodiment of the present invention, it will be understood by those skilled in the art that numerous changes and modifications can be made, and it is aimed in the appended claims to cover all such changes and modifications as fall within the true spirit and scope of the present invention.

What is claimed as new and desired to be secured by Letters Patent of the United States is:

1. A grooming device comprising a motor, a gear housing removably attached to one end of said motor, a reduction gear mechanism disposed in said housing including means drivingly connected to said motor, a rotatable shaft having each of its ends extending outside said housing and drivingly connected to said reduction gear mechanism, said shaft having its axis disposed substantially perpendicular to the longitudinal axis of said motor, a pair of rotatable brushes each overlying one of the shaft ends extending from said housing, a double shield attached to said housing comprising an arcuate portion overlying said brushes and a trailing skirt portion shielding said motor from said brushes, said shield also including a flat step portion interconnecting said arcuate portion and said skirt portion effectively defining a reverse bend in said shield, and means defining an opening in said shield adjacent the center thereof through which the end of said housing attached to said motor extends, the casing of said motor serving as the handle of said device whereby said trailing skirt portion of said shield protects the handle and hence the hand of the operator manipulating said motor from particles raised by said brushes.

2. The grooming device of claim 1 in which there is provided a particle receptacle attached to said shield.

3. The grooming device of claim 1 in which a particle receptacle defined in part by said shield is provided, said particle receptacle being open at each end, said particle receptacle extending for the full length of both brushes.

References Cited in the file of this patent

UNITED STATES PATENTS

| | | |
|---|---|---|
| 557,944 | Beard | Apr. 7, 1896 |
| 1,213,742 | Carls | Jan. 23, 1917 |
| 1,562,377 | Spielman | Nov. 17, 1925 |
| 1,951,851 | Turner | Mar. 20, 1934 |
| 2,190,206 | Churchill | Feb. 13, 1940 |
| 2,460,183 | Mayer | Jan. 25, 1949 |
| 2,563,049 | Liebelt | Aug. 7, 1951 |

FOREIGN PATENTS

| | | |
|---|---|---|
| 34,398 | Sweden | Feb. 19, 1913 |
| 93,908 | Sweden | Dec. 20, 1938 |
| 645,718 | France | Oct. 30, 1928 |